US011854087B1

(12) United States Patent
Campbell

(10) Patent No.: US 11,854,087 B1
(45) Date of Patent: Dec. 26, 2023

(54) SYSTEMS AND METHODS FOR WATER LOSS MITIGATION MESSAGING

(71) Applicant: United Services Automobile Association (USAA), San Antonio, TX (US)

(72) Inventor: Joseph Campbell, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 185 days.

(21) Appl. No.: 17/087,291

(22) Filed: Nov. 2, 2020

Related U.S. Application Data

(63) Continuation of application No. 15/365,703, filed on Nov. 30, 2016, now Pat. No. 10,825,096, which is a continuation of application No. 14/286,401, filed on May 23, 2014, now abandoned.

(60) Provisional application No. 61/826,780, filed on May 23, 2013.

(51) Int. Cl.
    *G06Q 40/08* (2012.01)
    *G06Q 10/067* (2023.01)
    *G06N 7/01* (2023.01)

(52) U.S. Cl.
    CPC .............. *G06Q 40/08* (2013.01); *G06N 7/01* (2023.01); *G06Q 10/067* (2013.01)

(58) Field of Classification Search
    None
    See application file for complete search history.

(56) References Cited

U.S. PATENT DOCUMENTS

| | | | | |
|---|---|---|---|---|
| 5,893,072 A | * | 4/1999 | Zizzamia | G06Q 10/02 705/5 |
| 6,192,347 B1 | * | 2/2001 | Graff | G06Q 40/04 705/36 R |
| 7,392,201 B1 | * | 6/2008 | Binns | G06Q 10/04 600/300 |
| 7,693,728 B2 | * | 4/2010 | Underwood | G06Q 40/08 705/2 |
| 7,697,646 B2 | * | 4/2010 | Mosier | H03H 17/0422 375/350 |
| 7,769,609 B1 | * | 8/2010 | Woll | G06Q 40/08 705/4 |
| 8,275,707 B1 | * | 9/2012 | Boyd | G06Q 40/00 705/40 |

(Continued)

*Primary Examiner* — William J Jacob
(74) *Attorney, Agent, or Firm* — Fletcher Yoder, P.C.

(57) ABSTRACT

A computer-implemented method, includes identifying, a set of insurance policyholders that have experienced water loss and a second set of insurance policyholders that have not experienced water loss. The method also includes determining an attribute indicative of increased likelihood of future water loss using a predictive model using a percentage of the first set of insurance policyholders defining a first sample size of the first set of insurance policyholders that is smaller relative to a percentage of the second set of insurance policyholders defining the second sample size of the second set of insurance policyholders. Further, the method includes identifying at least one targeted insurance policyholder having an increased likelihood of water loss, based upon the attribute and providing a water loss mitigation strategy to the at least one targeted insurance policyholder.

19 Claims, 3 Drawing Sheets

(56) References Cited

U.S. PATENT DOCUMENTS

| | | | |
|---|---|---|---|
| 2003/0028466 A1* | 2/2003 | Jenson | G06Q 40/08 |
| | | | 705/36 R |
| 2004/0260579 A1* | 12/2004 | Tremiti | G06Q 40/08 |
| | | | 705/4 |
| 2005/0262013 A1* | 11/2005 | Guthner | G06Q 40/025 |
| | | | 705/38 |
| 2006/0052945 A1* | 3/2006 | Rabinowitz | G16H 50/70 |
| | | | 702/20 |
| 2007/0016542 A1* | 1/2007 | Rosauer | G06Q 10/067 |
| | | | 706/21 |
| 2008/0195650 A1* | 8/2008 | Lingenfelder | G06N 20/00 |
| | | | 707/999.102 |
| 2008/0312969 A1* | 12/2008 | Raines | G06Q 10/10 |
| | | | 705/4 |
| 2009/0324049 A1* | 12/2009 | Kontos | G06T 7/40 |
| | | | 382/173 |
| 2010/0063851 A1* | 3/2010 | Andrist | G06Q 40/08 |
| | | | 705/4 |
| 2011/0071855 A1* | 3/2011 | Vadiveloo | G06Q 40/06 |
| | | | 705/36 R |
| 2011/0153419 A1* | 6/2011 | Hall, III | G06Q 30/0254 |
| | | | 283/56 |
| 2011/0184766 A1* | 7/2011 | Virdhagriswaran | G06Q 40/08 |
| | | | 705/26.1 |
| 2012/0150725 A1* | 6/2012 | Moebs | G06Q 40/08 |
| | | | 705/38 |
| 2014/0337047 A1* | 11/2014 | Mears | G16H 50/70 |
| | | | 705/2 |
| 2015/0019262 A1* | 1/2015 | Du | G06Q 40/08 |
| | | | 705/4 |

\* cited by examiner

SYSTEMS AND METHODS FOR WATER LOSS MITIGATION MESSAGING

CROSS-REFERENCE TO RELATED APPLICATIONS

The present application claims priority to and the benefit of U.S. patent application Ser. No. 15/365,703, filed on Nov. 30, 2016, which claims priority to U.S. patent application Ser. No. 14/286,401, filed on May 23, 2014, which claims priority to U.S. Provisional Patent Application Ser. No. 61/826,780, filed on May 23, 2013, the contents of which are incorporated herein by reference in their entirety.

BACKGROUND

1. Field of the Invention

The disclosed embodiments generally relate to computerized systems and methods for reducing homeowner policyholder damages, and more particularly to reducing future policyholder damages due to water loss.

2. Description of the Related Art

Homeowner insurance policies generally bear some risk of water loss. Insurers have a wealth of mitigation tools and strategies available for the insured that are potentially useful in preventing future water loss. While generally satisfactory for their intended purposes, conventional methods of mitigating future water loss such as by messaging all policyholders can be inefficient. It would therefore be useful to identify policyholders within the population of insured that are of high-risk of water loss for concentration of water loss mitigation efforts.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for identifying high-risk policy insurance policyholders is described in which predictive modeling is utilized to identify insurance policyholders at high-risk of water loss.

BRIEF DESCRIPTION OF THE DRAWINGS

The accompanying appendices and/or drawings illustrate various non-limiting, example, inventive aspects in accordance with the present disclosure.

DETAILED DESCRIPTION OF THE DRAWINGS

Figure 1:
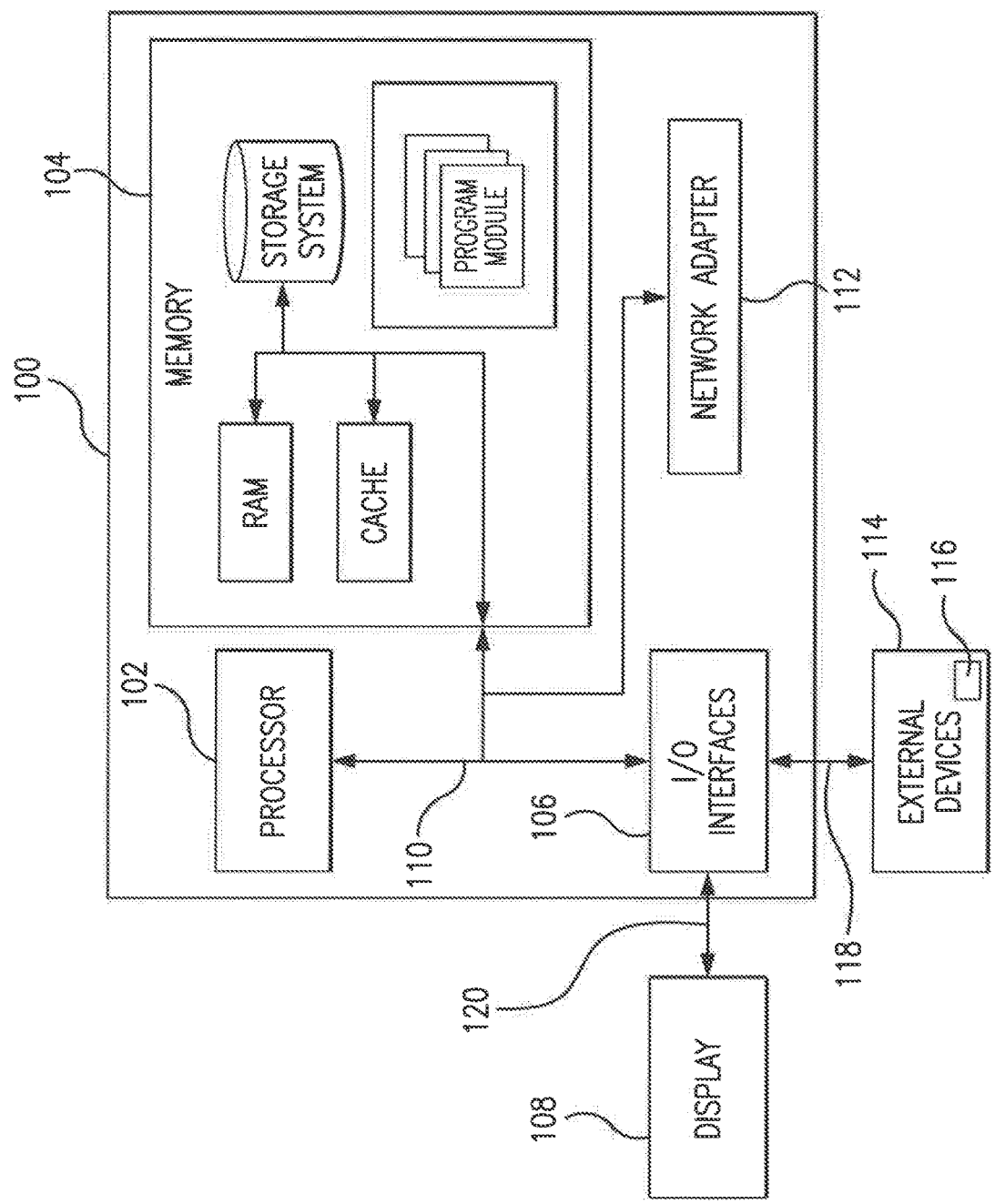
FIG. 1 is a schematic diagram of a system for estimating the likelihood of policyholder future water loss, showing a memory with program modules and dataflow.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either or both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the illustrated embodiments are not entitled to antedate such publication by virtue of prior invention. Further, the dates of publication provided may differ from the actual publication dates which may need to be independently confirmed.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 shows a computer system 100 for estimating the likelihood of homeowner insurance policyholder future water loss. Computer system 100 includes at least one processor 102, processing unit or plurality of processors, a memory 104, at least one input device 106 and at least one output device 108, coupled together via a bus or group of buses 110. As illustrated in FIG. 1, input device 106 is an input or output interface 106 such as a keyboard and output device 108 is a display. In certain embodiments, input device 106 and output device 108 could be the same device. An interface 112 such as a network adapter can also be provided for coupling the processing system 100 to one or more peripheral devices, for example interface 112 could be a PCI card or PC card. At least external one storage device 114 housing at least one database 116 can also be provided. The memory 104 can be any form of memory device, for example, volatile or non-volatile memory, solid-state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data and output data could be communicated to other devices via the network. The transfer of information and/or data over the network can be achieved using wired communications means or wireless communications means. A server can facilitate the transfer of data between the network and one or more databases. A server and one or more databases provide an example of an information source.

In the description that follows, certain embodiments may be described with reference to acts and symbolic representations of operations that are performed by one or more computing devices. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated, embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
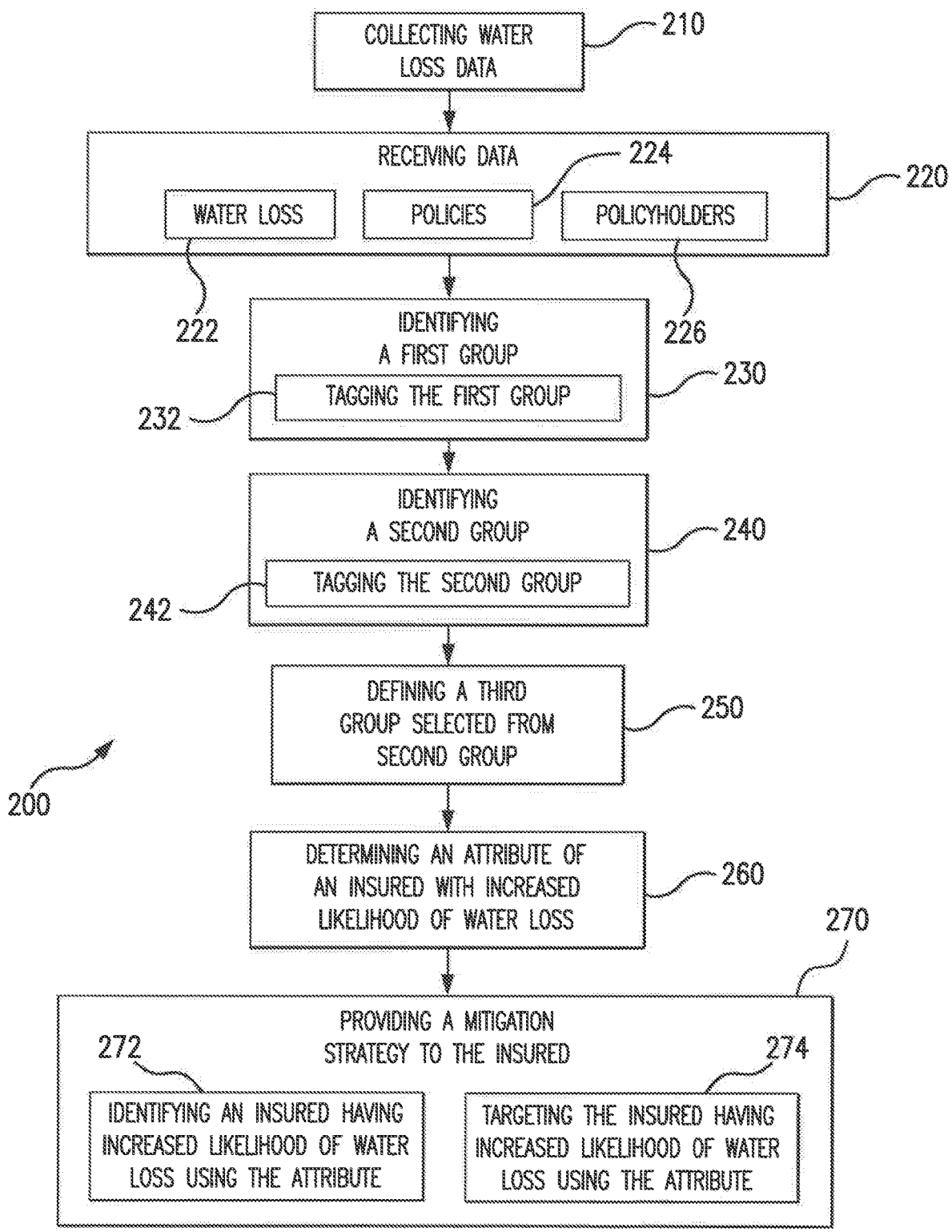
FIG. 2 is a block diagram of an embodiment of a method for estimating the likelihood of policyholder future water loss, showing method operations.

With reference to FIG. 2, a computer-implemented method 200 for estimating the likelihood of policyholder future water loss is shown. Method 200 includes a step 210 for collecting water loss data 210 and a step 220 for receiving insured data. Step 210 can include receiving at least one of policy and policyholder water loss experience in the form of prior and pending water loss claims. Step 220 can include receiving at least one of collected water loss data 222, homeowner insurance policy data 224, and homeowner policyholder data 226. It is contemplated that the data can include at least one of an age of an insured's home, a deductible amount of an insured homeowner policy, or a size of the insured's home. The policy and policy holder data can also include at least one of an indicator whether an insured's home is located in a high water loss county, an indicator of whether the insured's home has a burglar alarm, a policy surcharge indicator, an indicator of whether (or the number of) policy cancellations for non-payment of policy premiums and the like.

Method 200 also includes a step 230 for identifying a first group if insured having prior water loss experience, a step 240 for identifying a second group of insured not having (i.e. without) prior water loss experience, and a step 250 for defining a third group of insured derived from the second group of insured. Step 230 can include a step 232 for tagging the first group with a first tag indicating prior water loss experience. Step 240 can include a corresponding step 242 for tagging the second group with a second tag indicating no prior water loss experience. Step 250 can include defining the third group of insured by randomly sampling the second group of insured. Alternatively and optionally, step 250 can include oversampling the first group of insured. This can improve the reliability of the predictions in populations where the one of the first and second groups is relatively small in comparison to the other, such as when first group is about 1.5% the size of the second group for example.

Method 200 additionally includes a step 260 for determining an attribute indicative of increased likelihood of future water loss using predictive modeling using the first and third groups of insured, such as by assigning risk of incidents to policyholders using information obtained from policyholders, and a step 270 for providing a mitigation strategy to the insured having the determined attribute. Step 270 can include a step 272 for identifying at least one insured having increased likelihood of water loss and a step 274 for targeting the insured having increased likelihood of water loss using the attribute. The water loss mitigation strategy can be provided directly to the insured by at least one electronic vehicle, such as by a banner message presented to the user via a user portal, a hyperlink presented to the user and directing the user to a landing page presenting various mitigation strategies, or an email message. The water loss mitigation strategy can also be provided to the insured indirectly, such as by presenting a hyperlink to a landing page presenting mitigation strategies to a service provider in communication with the insured.

Figure 3:
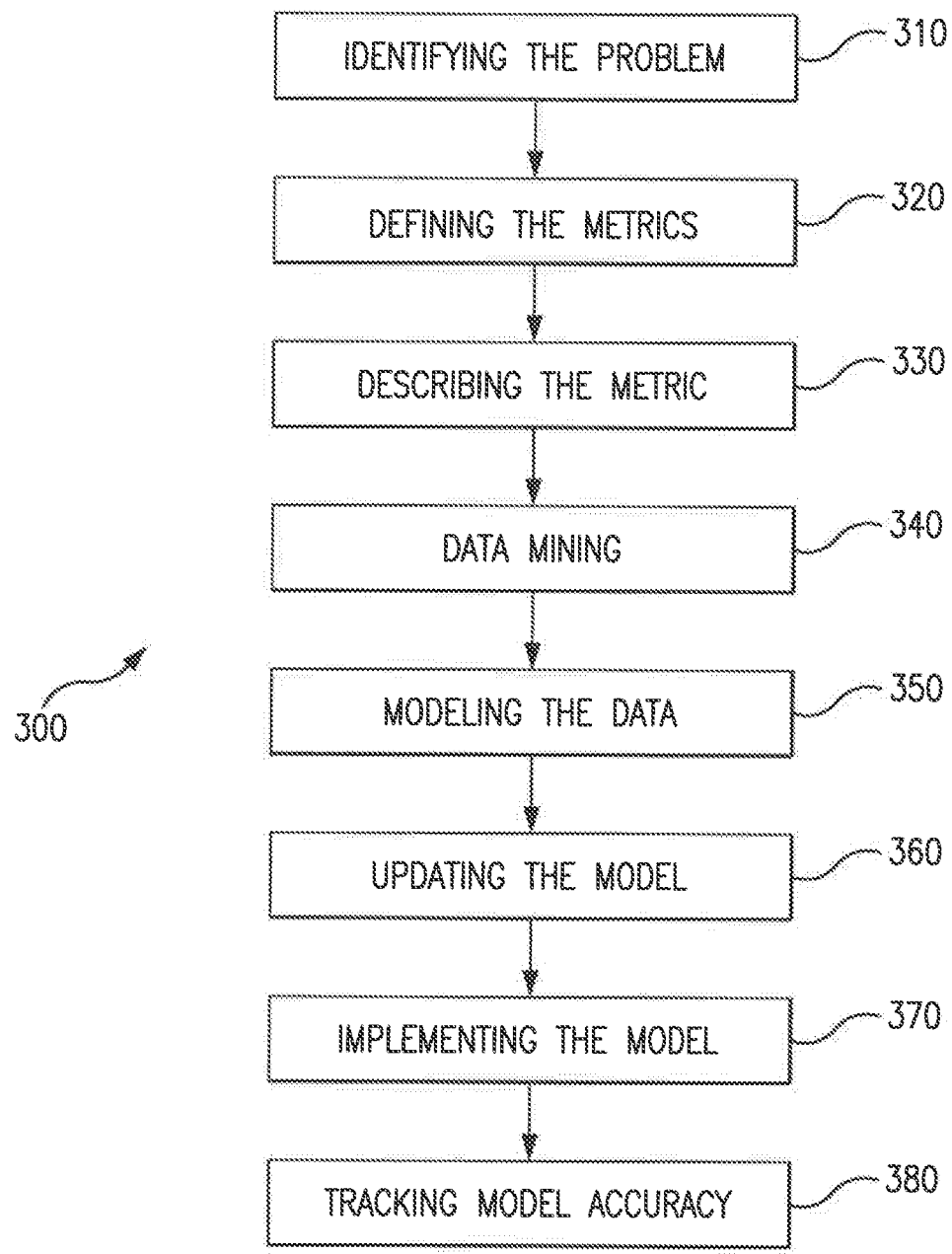
FIG. 3 is a block diagram of another embodiment of a method for estimating the likelihood of policyholder future water loss, showing operations for constructing a water loss model.

With reference to FIG. 3, method 200 can additionally include a step 300 for constructing a water loss model. Constructing the model generally includes identification, definition, description, and data mining operations for purposes of model constructing. Once the model is constructed, the model is implemented, maintained, and tracked. In these respects, constructing a water loss model includes a step 310 for identifying the underlying problem that the modeling process need address and a step 320 for defining the metric intended to be influenced by the model. This can include an inquiry into whether reliable data exists to support the analysis.

Constructing the water loss model further includes a step 330 for describing the data, a step 340 for data mining, and a step 350 for modeling the data. Step 330 for describing the data can include analyzing statistics describing one or more metrics of interest such as through one-way frequencies and/or averages that can potentially change over time. Step 340 for data mining can include determining how variables of interest interact with one another and potentially identifying relationship of predetermined strength that warrant immediate action. Step 350 for modeling the data can include determining whether a viable model can be constructed in view of the relationships found during data mining.

Constructing the water loss model additionally includes a step 360 for maintaining the model, a step 370 for implementing the model, and a step 380 for tracking model performance. Step 360 for maintaining the model can include assessing model performance and adjusting the model over time. Step 370 for implementing the model can include inserting the model into a recurring process, such as a business process like policy pricing for example. Step 380 for tracking model performance can include tracking the results of the model over time to ensure that the model works as predicted, such as through a quantification of model impact for example.

An aspect of the water loss model is to estimate the likelihood of a future water loss for an insured. The water loss model preferably targets policyholders most likely to have a water loss so that an insurance carrier can target their mitigation strategies for water loss to only those policyholders at a "high" risk of water loss. For example, the model segments a population of homeowner insurance policyholders using a predetermined value representative of policyholder risk of water loss. Policyholders with risk below the predetermined value have low-risk of water loss. Policyholders with risk above the predetermined cutoff value have high-risk of water loss. For example, policyholders in a top predetermined percentage of risk scores in the policyholder population can be deemed to high-risk, e.g. policyholders having the highest 10% of risk scores. Alternatively, policyholders having a risk score a predetermined percentage above the overall average of the policyholder population can be deemed high risk, e.g. policyholders having a risk score at least 50% above the population average risk score.

Constructing predictive models can provide information applicable to insurance carrier business decisions. For example, policy data can be used to identify policyholders likely to leave an insurance carrier, identify new product acquisitions, or access homeowner property and casualty loss risk. In any of the above examples, policy data is used to build a model of predictive risk for some event likelihood, be it buying a new car, buying a new insurance product, or experiencing a claim.

Collecting data a specific moment in time provides a cross-sectional research design to create the modeling data set. This allows for analyzing the data and determining relevant attributes of insurance policies, policyholders, and prior water loss experiences in a short period of time. In contrast to longitudinal designs or cross-sequential designs, cross-sectional designs are relatively inexpensive and not as time consuming. However, cross-sectional designs do not allow the assessment of the actual changes in water loss claims as they develop since the same people are not observed over time. It is to be understood that embodiments of the systems and methods described herein can be implemented using insured data using cross-sequential designs.

Data relevant to water losses for homeowners is of particular interest. Identifying the characteristics of homeowner policies that could lend insight can be of fundamental interest to reducing water loss risk for a population of insured. As will be appreciated, determining policy, policyholder, and/or prior water loss experience attributes are important in identifying which policy characteristics play a role in predicting water loss.

In order to predict future water losses using the relevant policy information it is to be appreciated that additional various policy and policyholder characteristics for each homeowner policy are collected and then aggregated with information on water claims. In doing so, the association between water claim experiences and these various policy characteristics are estimated and a model created to predict the probability of a future water loss for the population of insurance policies To analyze the results of these associations, a standard logistic regression model is used to estimate the individual probability that a policyholder will experience a non-catastrophic water loss within the next year. Additionally, covariance between covariates, likelihood ratio test, multicollinarity tests, Pearson and Deviance residuals plots, Hosmer and Lemeshow's goodness-of-fit tests, the receiver operator characteristic, and/or measures of concordance and discordance are utilized to how best to choose the most suitable model. In certain embodiments, a 30% holdback data set is used for in-sample validation along with an out-of-time sample to help determine the adequacy and consistency of a scoring model.

Embodiments of the systems and methods described herein can further include constructing a database. The database can include data aggregated from a plurality of pre-existing databases, such as a first database comprising an analytical data store (ADS) and a second database comprising a claims analysis and reporting data store (CARDS). The ADS database includes policy and policyholder information relating to dwelling (e.g. homeowner) lines of business, and in embodiments includes information policy and policyholder information over a predetermined time period. In certain embodiments, the ADS database is updated on a weekly and monthly basis from a data warehouse containing integrated policy data, financial and claims data for property and casualty automobile policies, and financial and claims data for property and casualty homeowner policies. Either or both of the first and second databases can include one or more tables implemented using DB2® relational database tables. For an exemplary analysis, determining attributes relevant to increased likelihood of future water loss includes data relating losses and coverage spanning a predetermined period (sampling frame), such as one year time period for example.

Embodiments of the systems and methods described herein can include merging homeowner data, e.g. policy and/or policyholder data, from the ADS was merged with claims data from CARD in order to predict whether or not one or more homeowners can be expected to experience future water loss. This can include a comprehensive snapshot of an insurance carrier's property book of business including substantially all homeowner policies in force at the end of the predetermined period (sampling frame). In an exemplary embodiment, the snapshot can include all policyholders with at least one homeowner policy in force at the end of the predetermined period (sampling frame) excluding condominium policies. An end date of the predetermined period (sampling interval) can be chosen so that a full-year is used to capture claims history in the CARD and be a recent enough to represent an insurance carrier future interests. For example, a predetermined period (interval) ending in Dec. of 2011 can allow for use of the most recent full year as of the date of the model build while allowing for extrapolating insurance carrier loss experience to subsequent years.

A model constructed in accordance the method illustrated in FIG. 3 includes data acquired over a predetermined period of time. The predetermined interval is about a year time interval and the model is constructed shortly after the end of the predetermined interval. This allows for use of the most recent full year of policy data, policyholder data and water loss experience data.

The model is constructed using data from a relatively large group of insured, and an exemplary embodiment has about 2.4 million policies of which about 45,000 include prior water loss experience. Due the relatively low number of water loss experiences within the population during the sampling period, there is some chance that a model fit to the entire data set could under underestimate the probability of future water loss experiences. To improve this estimates produced by the model, a smaller representative sample was created in which a first group of insured, i.e. a target variable comprising policies and/or policyholders with water loss experience, was oversampled.

TABLE 1

Oversampling Statistics

| | Population | | Sample | |
|---|---|---|---|---|
| | Count | Percent | Count | Percent |
| Did Not Experience a Water Loss | 2,415,401 | 98.15% | 44,685 | 49.59% |
| Experienced a Water Loss | 45,437 | 1.85% | 45,437 | 50.41% |
| Total | 2,460,844 | 100.00% | 90,122 | 100.00% |

Source: Property ADS, January 2011

Above Table 1 compares the water loss experience between both the sampling frame and the sample. To better estimate the parameters used in a scoring model, a second group of insured, i.e. a dependent variable comprising policies and or policyholders without water loss, was oversampled. A "balanced" data set was created by randomly sampling 1.85% of the homeowners that did not experience a water loss and 100% of policyholders that experienced a water loss during the period of time, for example Jan. 1, 2011 through Dec. 31, 2011. This produces a sample size of about 90,000 from which the associations between having a water loss and various homeowner policy characteristics is estimated.

The dependent variable is the policyholder's experience with water loss. For example, an insurance carrier may keep a code indicating a grouping of cause of loss for reporting purposes in a table within the CARD having a plurality of levels associated with types of loss experience, one of the loss categories being associated with water loss experiences. This table can also include an indicator indicating that coverage was opened because of a water loss, coded with one or zero depending on whether or not coverage was opened due to water loss.

There were seven independent variables included, namely, the age of home, the amount of the policyholder's deductible, an indicator for whether the home is located in a high-water-loss county, the size of the home, an indicator for whether there is a burglar alarm at the home, an indicator for whether there is a loss surcharge on the policy, and the number of non-payment cancellations processed for the policyholder in the last 7 years. These variables can be found within the ADS or other database or database tables from which data is received.

In the exemplary model certain variables are either a direct or an indirect measure of the several major themes that correlate to water loss. For example, home age indicates that homes over 20 years old are more likely to have a water loss. Home age can be graduated into categorical levels dividing covered homes into four five-year age groups. For example, homes with ages between 20 to 49 years are divided into three ten-year age groups and homes more than fifty years old make up the final group and homes with missing or undefined ages placed into a level based on the average age of a home as observed in the sampling frame. Home age can then be treated as a variable and that can be further operationalized as eight separate indicators for the associated categories with any imputed values being added to the respective category. For relating attributes associated with home age homes with ages of less than five years old can from a baseline group for comparison purposes.

Two variables that capture exposure to damages from water loss included in the water loss model are the home size attribute and the deductible attribute. The home size attribute is a continuous measure of the total square footage of the residence. The deductible amount attribute is an operationalized as the dollar amount of the deductible for the policy. Similarly, other variables from the ADS can be aggregated to measure the percent or amount of the all peril and other peril deductible. Typically, these two variables are mutually exclusive and are associated with the types of dwelling insurance issued for homes in different geographical locations. If either of these variables contain the amount of deductible, the amount of deductible is given that amount. If these variables contain a percentage, the value of the deductible can calculated by taking the associated percentage and multiplying it by the amount of the dwelling coverage exposure available from the ADS. For example, if a policy had a one percent all peril deductible and a dwelling amount of $120,000, the deductible would be calculated as one percent of $120,000 or $1,200.

The high-water loss county indicator attribute is a proxy for the likelihood of loss in the water loss model. For example, a relatively small number of counties in the United States (e.g. about 30) are typically have 50% higher than the countrywide average water loss frequency and include sufficiently sized policy bases for inclusion in the model. Since data within the ADS database generally includes the name of the county and state, respectively, a binary indicator can assigned to the high water loss county attribute to indicate whether or not a home is within one of the 30 counties identified. If a property location was within the high-frequency counties, the variable high-water-loss county is coded as one, otherwise it is coded as zero.

The burglar alarm indicator attribute is a proxy for home value in the water loss model. In an exemplary embodiment, the burglar alarm indicator attribute can be a multilevel categorical variable. For example, the burglar alarm indicator attribute can indicate the type of burglar alarm installed at the dwelling as either centrally monitored, locally monitored, remotely monitored, none, or data not available. In embodiments, the attribute is a binary indicator wherein an attribute value of one indicates that the home has a burglar alarm of some description (i.e. level) and an attribute value of zero indicates that no burglar alarm is present. A single indicator can be coded as a one if the policyholder had either a centrally monitored, locally monitored, or remotely monitored burglar alarm system, otherwise the attribute can be coded as zero.

The loss surcharge indicator attribute is a proxy for recent claim activity in the water loss model. If a policyholder had a recent loss, there is a loss surcharge. In embodiments, the loss surcharge indicator attribute is a binary value wherein a one indicates that one or more claims have been processed within the predetermined time interval (e.g. the last year) and a zero indicates that no claim or claims have been processed with the predetermined time interval.

Finally, the number of times non-payment policy cancellations during the prior 7 years attribute is a proxy for the home upkeep and maintenance in the water loss model. As will be appreciated by those skilled in the art, non-payment policy cancellations can correlate with policyholder home maintenance insofar as policyholders who allow their policy to lapse are more likely to neglect home maintenance and be more likely to experience water loss.

For the water loss model, the distributional assumption of the errors needed for standard ordinary least squares regression is violated due to the dichotomous measurement of the dependent variable. Many other methods have been proposed to estimate predicted probabilities that an event of interest will occur; however, none are more suited to estimating dichotomous outcomes than logistic regression. One advantage this method has over other methods, like neural networks or decision trees, when predicting dichotomous outcomes lies in its treatment of the outcome variable. Instead of modeling the 0 or 1 nature of the dependent variable, logistic regression models the log-odds of an event occurring as opposed to the event not taking place. In this case, a water loss occurs compared to it not occurring. This functional form allows for a linear combination of predictor variables, easing the burden of explanation. The logistic regression equation is written as:

$$\ln\left[\frac{p}{1-p}\right] = \alpha + \beta_1 x_1 + \beta_2 x_2 + \ldots + \beta_i x_i,$$

where p is the probability of a policyholder experiencing a water loss, a is a starting point for the estimated log odds generally thought of as a global rate, and the $x_i$'s are the included policy characteristics used to predict the likelihood of a water loss with the associated $fl_i$'s their corresponding weights.

Since we are, modeling the log-odds, the outputs from the logistic regression model is estimated predicted probabilities ranging between zero and one, and represents a policyholder's risk of experiencing a water loss. With some simple mathematical formulations, the predicted probabilities are:

$$P(y=1\mid x) = \frac{e^{\alpha+\beta_1 x_1+\beta_2 x_2+\ldots+\beta_i x_i}}{1+e^{\alpha+\beta_1 x_1+\beta_2 x_2+\ldots+\beta_i x_i}}.$$

Each policyholder's attributes, the $x_i$'s, are put through the right hand side of the equation which includes the estimated coefficients, or associated weights, from the model fit to our sample data in order to generate the predicted probabilities used strategically segment the entire homeowner policies in force for targeted mitigation messaging.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. For instance, embodiments of the systems and methods described herein can provided targeted mitigation information to policyholders at high-risk of water loss. As will be appreciated by those skilled in the art, a potentially large number of homeowner insurance policyholders are at some level of risk of water loss.

As will also be appreciated by those skilled in the art, insurers typically have access to a wealth of mitigation strategies that the insured could find useful in preventing future water losses. Since blanket messaging all or large numbers of policyholders can be inefficient, identifying policyholders at relatively high-risk of water loss allows for concentrating mitigation efforts at the insured most likely to benefit from the effort. Predictive modeling enables identifying policyholders with high-risk of water loss. Using available information on the insured's home, policy, and local area characteristics, a logistic regression model can be developed that estimates each policyholder's likelihood of a future water loss. These estimates can enable targeting by restricting application of mitigation strategies to only those policyholders deemed at high-risk of water loss. Targeted messaging in turn reduces the impact on policyholders while providing relevant mitigation strategies to policyholder in which the messaging should have the most significant impact. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

The invention claimed is:

1. A computer-implemented method, comprising:
   acquiring, from an analytical data store (ADS), policyholder data identifying an overall set of policyholders;
   acquiring, from a claims analysis and reporting data store (CARDS), claims data indicative of properties that have incurred water loss;
   generating model data, by merging the policyholder data with the claims data;
   identifying, from the model data, a first set of policyholders that have experienced water loss and a second set of policyholders that have not experienced water loss, wherein the first set of policyholders is smaller than the second set of policyholders;
   constructing a predictive water loss model that estimates a likelihood of a future water loss for the overall set of policyholders by data mining policy information associated with the overall set of policyholders to identify relationships between metrics of interest;
   determining a size of a first sample of the first set of policyholders and a size of a second sample of the second set of policyholders such that the first sample of the first set of policyholders and the second sample of the second set of policyholders are balanced in a balanced data set, wherein the balanced data set is implemented by:
      identifying a first percentage of the overall set of policyholders that are the first set of policyholders;
      defining the size of the first sample as an entirety of the first set of policyholders;
      defining the size of the second sample as a second percentage of the second set of policyholders, wherein the second percentage is equal to the first percentage; and
      creating the balanced data set by sampling the model data in accordance with the size of the first sample and the size of the second sample;
   determining an attribute indicative of increased likelihood of future water loss via the predictive water loss model using the balanced data set;
   based upon the attribute, identifying at least one targeted policyholder having an increased likelihood of water loss using a logistic regression that models a log-odds of water loss versus non-water-loss based on a linear combination of weighted predictor variables; and
   providing a water loss mitigation strategy to the at least one targeted policyholder.

2. The computer-implemented method of claim 1, comprising identifying the first set of policyholders and the second set of policyholders by accessing and analyzing policy information stored in a database to distinguish the first set of policyholders from the second set of policyholders as those that have prior water loss claims, pending water loss claims, or both.

3. The computer-implemented method of claim 1, comprising providing the water loss mitigation strategy via an electronic message comprising a banner message of a policyholder portal, a hyperlink, an e-mail message, or any combination thereof.

4. The computer-implemented method of claim 1, comprising further defining the first sample by oversampling the first set of policyholders.

5. The computer-implemented method of claim 1, comprising further defining the second sample by randomly sampling the second set of policyholders.

6. The computer-implemented method of claim 1, comprising:
   determining predicted probabilities of water loss for each policyholder of the overall set of policyholders; and
   identify the at least one targeted policyholder based upon the predicted probabilities.

7. The computer-implemented method of claim 1, comprising:
   identifying the at least one targeted policyholder based upon the predictive water loss model by segmenting the overall set of policyholders into a set of high risk policyholders and a set of low risk policyholders; and
   identifying each of the set of high risk policyholders as the at least one targeted policyholder.

8. The computer-implemented method of claim 7, wherein the set of high risk policyholders are identified as those having a risk above a predetermined threshold value.

9. The computer-implemented method of claim 7, wherein the set of high risk policyholders are identified as those having a risk above an overall average of the overall set of policyholders.

10. A tangible, non-transitory, machine-readable medium, comprising machine-readable instructions that, when executed by one or more processors, cause the one or more processors to:
   acquire, from an analytical data store (ADS), policyholder data identifying an overall set of policyholders;
   acquire, from a claims analysis and reporting data store (CARDS), claims data indicative of properties that have incurred water loss;
   generate model data, by merging the policyholder data with the claims data;
   identify, from the model data, a first set of policyholders that have experienced water loss and a second set of policyholders that have not experienced water loss, wherein the first set of policyholders is smaller than the second set of policyholders;
   construct a predictive water loss model that estimates a likelihood of a future water loss for the overall set of policyholders by data mining policy information associated with the overall set of policyholders to identify relationships between metrics of interest;
   determine a size of a first sample of the first set of policyholders and a size of a second sample of the second set of policyholders such that the first sample of the first set of policyholders and the second sample of the second set of policyholders are balanced in a balanced data set, wherein the balanced data set is implemented by:
   identifying a first percentage of the overall set of policyholders that are the first set of policyholders;
   defining the size of the first sample as an entirety of the first set of policyholders;
   defining the size of the second sample as a second percentage of the second set of policyholders, wherein the second percentage is equal to the first percentage; and
   creating the balanced data set by sampling the model data in accordance with the size of the first sample and the size of the second sample;
determine an attribute indicative of increased likelihood of future water loss via the predictive water loss model using the balanced data set;
determine predicted probabilities of water loss for each policyholder of the overall set of policyholders;
based upon the attribute and the predicted probabilities, identify at least one targeted policyholder having an increased likelihood of water loss; and
provide a water loss mitigation strategy to the at least one targeted policyholder.

11. The tangible, non-transitory, machine-readable medium of claim 10, wherein the machine-readable instructions are configured to cause the one or more processors to provide the water loss mitigation strategy via an electronic message.

12. The tangible, non-transitory, machine-readable medium of claim 10, wherein the metrics of interest comprise a home age, a home size, a policy deductible amount, a policy loss surcharge indicator, a high-water-loss county indicator, a burglar alarm indicator, a number of policy non-payment cancellations, or a combination thereof.

13. The tangible, non-transitory, machine-readable medium of claim 10, wherein the machine-readable instructions are configured to cause the one or more processors to determine the attribute indicative of increased likelihood of future water loss based on data relating policy losses and policy coverage during a predetermined time period.

14. The tangible, non-transitory, machine-readable medium of claim 10, wherein the machine-readable instructions are configured to cause the one or more processors to identify the at least one targeted policyholder having an increased likelihood of water loss using a logistic regression that models a log-odds of water loss as opposed to non-water-loss based on a linear combination of weighted predictor variables.

15. A computer system, comprising:
a memory; and
a processor configured to:
   acquire, from an analytical data store (ADS), policyholder data identifying an overall set of policyholders;
   acquire, from a claims analysis and reporting data store (CARDS), claims data indicative of properties that have incurred water loss;
   generate model data, by merging the policyholder data with the claims data;
   identify, from the model data, a first set of policyholders that have experienced water loss and a second set of policyholders that have not experienced water loss by accessing and analyzing policy information stored in a database, wherein the first set of policyholders is smaller than the second set of policyholders;
   construct a predictive water loss model that estimates a likelihood of a future water loss for the overall set of policyholders, by data mining policy information associated with the overall set of policyholders to identify relationships between metrics of interest;
   determine a size of a first sample of the first set of policyholders and a size of a second sample of the second set of policyholders such that the first sample of the first set of policyholders and the second sample of the second set of policyholders are balanced in a balanced data set, despite the first set of policyholders being smaller than the second set of policyholders, by:
      identifying a first percentage of the overall set of policyholders that are the first set of policyholders;
      defining the size of the first sample as an entirety of the first set of policyholders;
      defining the size of the second sample as a second percentage of the second set of policyholders, wherein the second percentage is equal to the first percentage; and
      creating the balanced data set by sampling the model data in accordance with the size of the first sample and the size of the second sample;
   determine an attribute indicative of increased likelihood of future water loss via the predictive water loss model using the balanced data set;
   determine predicted probabilities of water loss for each policyholder of the overall set of policyholders;
   based upon the attribute and the predicted probabilities, identify at least one targeted policyholder having an increased likelihood of water loss; and
   provide a water loss mitigation strategy to the at least one targeted policyholder.

16. The computing system of claim 15, wherein the processor is configured to identify the at least one targeted policyholder having an increased likelihood of water loss using a logistic regression that models a log-odds of water loss as opposed to non-water-loss based on a linear combination of weighted predictor variables.

17. The computing system of claim 15, wherein the processor is configured to:
   identify the at least one targeted policyholder based upon the predictive water loss model by identifying a set of high risk policyholders having a water loss risk that is above a predetermined threshold value or an overall average of the overall set of policyholders; and
   identify each of the set of high risk policyholders as the at least one targeted policyholder.

18. The computing system of claim 15, wherein the database comprises an analytical data store (ADS), a claims analysis and reporting data store (CARDS), or both.

19. The computing system of claim 15, wherein the database comprises one or more tables implemented using DB2® relational database tables.

* * * * *